United States Patent [19]

McCormick

[11] 4,299,401
[45] Nov. 10, 1981

[54] PISTON RING AND METHOD OF MAKING SAME

[75] Inventor: Harold E. McCormick, Ballwin, Mo.

[73] Assignee: Ramsey Corporation, Manchester, Mo.

[21] Appl. No.: 74,734

[22] Filed: Sep. 12, 1979

[51] Int. Cl.³ .............................................. F16J 9/22
[52] U.S. Cl. .................................... 277/216; 277/224; 29/156.6
[58] Field of Search ....................... 277/224, 223, 216; 29/156.6, 156.61

[56] References Cited

U.S. PATENT DOCUMENTS

| 2,511,874 | 6/1950 | Phillips | 277/216 |
| 2,905,512 | 9/1959 | Anderson | 29/156.6 X |
| 3,435,502 | 4/1969 | Thompson et al. | 29/156.63 |
| 3,575,433 | 4/1971 | Beyer et al. | 29/156.6 |
| 3,650,537 | 3/1972 | Sugahara | 277/216 X |
| 4,123,072 | 10/1978 | Sharpe | 277/216 |
| 4,161,321 | 7/1979 | Hendrixon et al. | 277/224 X |

FOREIGN PATENT DOCUMENTS

| 704918 | 3/1965 | Canada | 29/156.6 |
| 37325 | 3/1927 | Denmark | 29/156.61 |
| 483916 | 10/1929 | Fed. Rep. of Germany | 29/156.6 |
| 2714462 | 10/1977 | Fed. Rep. of Germany | 29/156.6 |
| 933428 | 8/1963 | United Kingdom | 277/223 |

OTHER PUBLICATIONS

Iron Age, Jan. 31, 1977, pp. 25-28.
Laser Technology, 1979, 2nd Edition, pp. 128-131 & title page, (Howard W. Sams & Co., Inc.: Indianapolis), Muncheryan.
Production, Nov. 1976, pp. 74-81.

Primary Examiner—Robert S. Ward, Jr.
Attorney, Agent, or Firm—Yount & Tarolli

[57] ABSTRACT

A piston ring is to be mounted in a groove in a piston. The piston ring has sidewalls for engaging sidewalls of the piston ring groove. Each of the sidewalls of the piston ring is hardened in respective localized areas. The localized areas each include a band of hardened material extending around each respective sidewall of the piston ring near the outer periphery of the piston ring. The hardened areas terminate short of the outer periphery of the piston ring. The piston ring due to the termination of the hardened areas short of the outer periphery of the piston ring has unhardened side surface areas immediately adjacent the outer periphery thereof for location adjacent the corners of the piston ring groove at the outer periphery of the piston. The localized areas are hardened by moving a piston ring blank relative to a laser beam, after the piston ring blank is machined.

11 Claims, 6 Drawing Figures

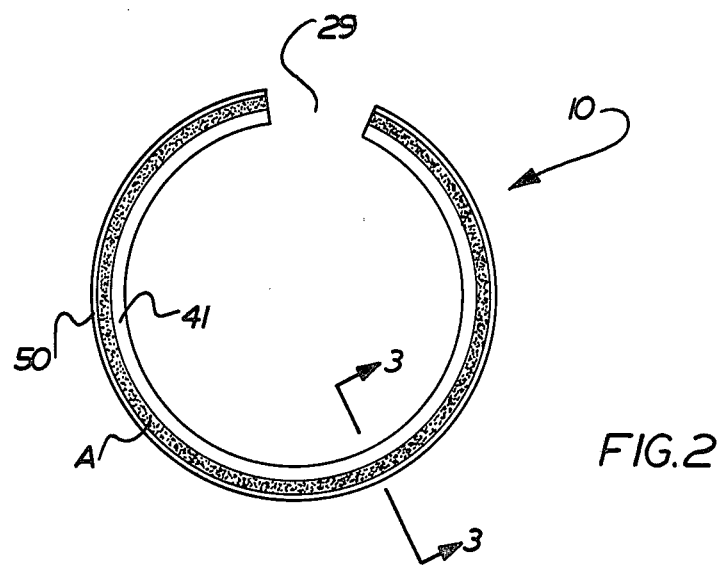
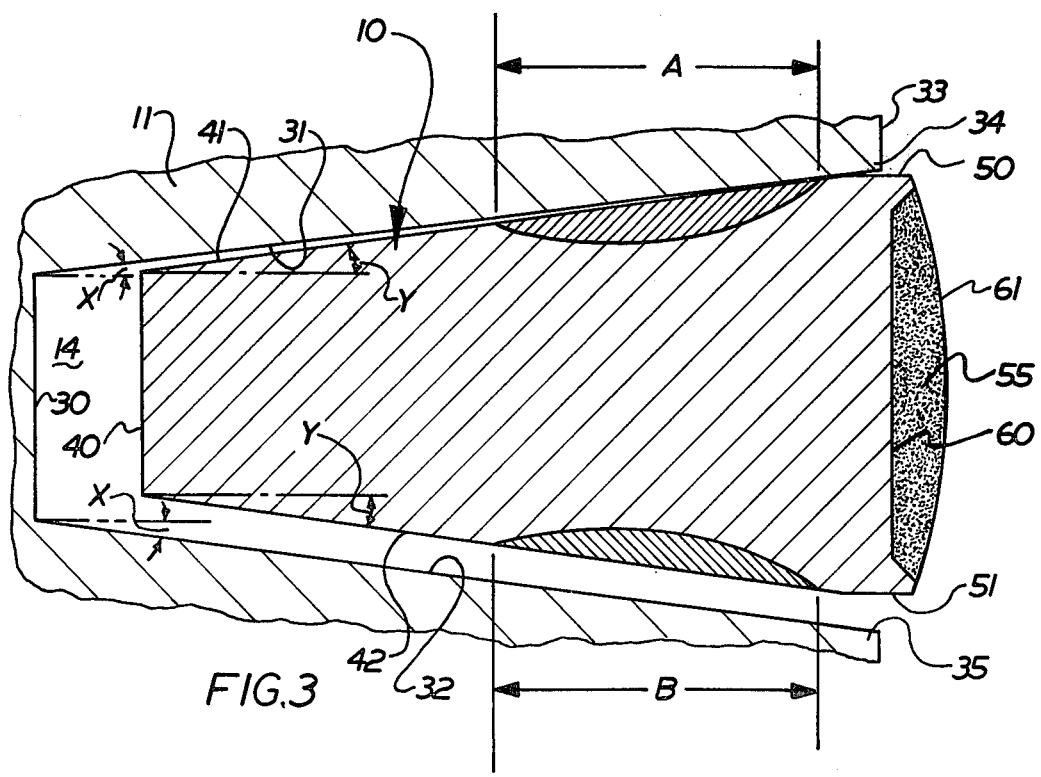

PISTON RING AND METHOD OF MAKING SAME

BACKGROUND AND SUMMARY OF THE PRESENT INVENTION

The present invention relates to a piston ring, and a method of making a piston ring.

As is known, a piston ring is located in a piston ring groove in a piston which moves in a cylinder. In an internal combustion engine, fuel is directed into the cylinder and ignited to move the piston in the cylinder. The expanding gases created by the ignited fuel force the piston in a power stroke.

Traditionally, a piston carries a compression ring which is located adjacent the surface against which the expanding gases act. The compression ring functions to block flow of the gases between the piston and cylinder in order to maximize the gases acting directly on the piston to move it. Of course, any blow-by, i.e., flow of gases past the piston ring, minimizes the force acting to move the piston in the power stroke and thereby detrimentally affects fuel efficiency.

Typically, compression piston rings are located in a tapered piston ring groove at the upper end of the piston. The sidewalls of the piston ring are subject to substantial wear during piston movement. The wear on the sidewalls of a compression piston ring is greatest at a location generally adjacent the outer periphery of the piston and the side wear is at a minimum at the inner periphery of the compression piston ring.

Techniques have been utilized in order to minimize side wear of the piston ring. These techniques have involved providing a hardened surface on the sidewalls of the piston ring. Such is accomplished by hardening the entire piston ring blank by a conventional heat treatment. This, of course, has resulted in the entire outer periphery of the piston ring blank being hardened including the entire sidewall surface. After hardening, the blank is machined. Such machining includes turning a groove, for receiving a wear coating, in the outer periphery of the ring, milling a gap in the ring, etc. These machining steps were performed after hardening because if performed before hardening, the heat treatment for hardening would affect the machined areas and cause distortion, etc. This, however, has created machining difficulties because hardened piston ring blanks are difficult to machine.

Further, because the entire periphery of the ring was hardened, the edges of corners of the piston ring, particularly the edges adjacent the surface which is to engage the cylinder bore were subject to nicking during handling and/or assembly. Such nicking creates stress-risers and fatigue cracks result. Such stress-risers and fatigue cracks greatly affect the efficiency and effectiveness of the piston ring and result in blow-by occurring and/or ring breakage.

The present invention is directed to a piston ring which is not susceptible to nicking at the edges. Further, the piston ring of the present invention may be made by a process which does not require machining of a hardened ring. Thus, the present invention is more effective than the prior art piston rings, and can be manufactured without the machining problems encountered in machining a hardened piston ring blank.

Specifically, the present invention is directed to a piston ring which has side surfaces hardened in a localized area intermediate the radial extent of the respective side surfaces. Thus, the problem of fatigue cracks which occur at the intersection of the side surfaces and the outer peripheral wall of the piston ring which engages the cylinder bore is minimized. Also the piston ring of the present invention has a relatively soft material area at the outer periphery of the piston ring which is adjacent the outer periphery of the piston. As a result, the softer material of the piston ring may seat during initial operation of the piston against the piston and provide an effective seal. This, of course, also minimizes the possibility of blow-by.

Further, the localized areas of the side surfaces of the piston ring of the present invention are hardened after the piston ring blank is machined. Specifically, the piston ring of the present invention is made of cast iron material or steel strip material. The material is formed into a ring. After the material is formed, other manufacturing operations are performed on the ring. For example, the ring is turned (i.e., machined) in order to provide a groove on the outer periphery of the ring for receipt of a wear material which is bonded to the ring material and engages the bore of the cylinder. Also, the ring is milled in order to mill a gap into the ring.

All of the above machining steps occur prior to hardening of the localized areas of the side surfaces of the ring. The localized areas of the side surfaces of the piston ring are hardened by a laser technique. The ring is moved into a position adjacent a laser beam and the ring is rotated at a predetermined speed relative to the laser beam. An annular band of hardened material on the side surface of the ring results. The hardening occurs due to the fact that the laser beam heats the material of the ring to above the critical temperature. The heat conduction of the base material and a supplementary water quench lowers the temperature at a critical rate to provide hardened martinsite, which material solidifies after passing the laser beam. There is no distortion of the ring. Both side surfaces of the ring are hardened by rotating the ring relative to a laser beam.

Accordingly, the piston ring of the present invention not only has a hard side surface in order to minimize side wear of the piston ring as is conventional but also is constructed to minimize the possibility of cracks at the corner of the piston ring adjacent the cylinder wall in which the piston moves which cracks greatly increase the possibility of ring breakage and blow-by. Further, the present invention provides a relatively soft material on the sidewall of the piston ring adjacent the corner of the piston ring groove at the outer periphery of the piston so as to enable the piston and ring to seat together and thereby provide an effective seal therebetween. Finally, the piston ring of the present invention may be manufactured by a technique which greatly simplifies machining of the piston ring.

DESCRIPTION OF THE DRAWINGS

Further features of the present invention will be apparent to those skilled in the art to which it relates from the following detailed description of the present invention made with reference to the accompanying drawings in which:

FIG. 2 is a plan view of the compression piston ring embodying the present invention;

FIG. 3 is a cross-sectional view of the piston ring of FIG. 2 taken along the line 3—3 of FIG. 2 and illustrating the piston ring in a piston ring groove;

DESCRIPTION OF PREFERRED EMBODIMENT

Figure 1:
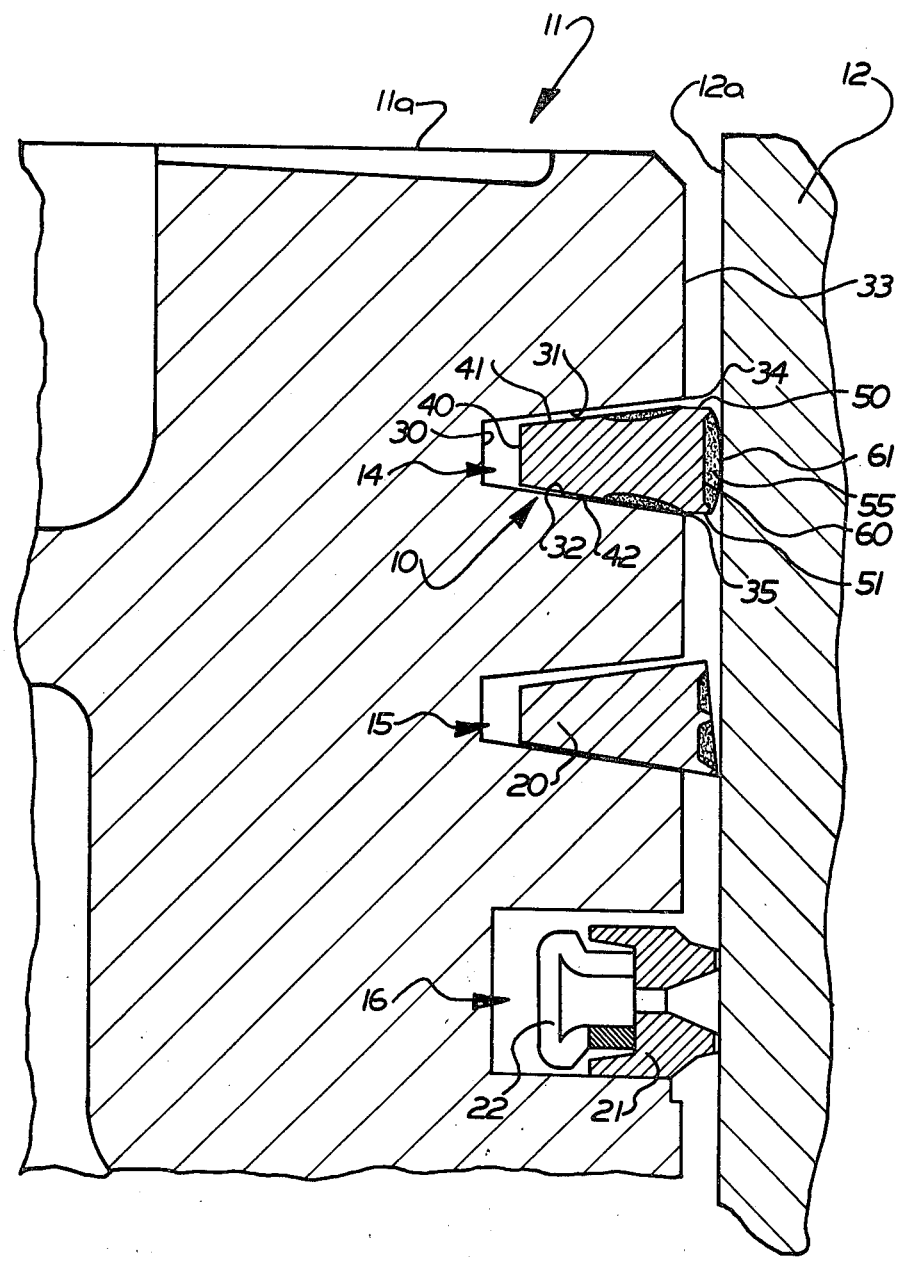
FIG. 1 is a cross-sectional fragmentary view of a piston having a compression piston ring embodying the present invention.

As discussed above, the present invention relates to a piston ring, and particularly a piston ring of an improved construction which not only has a hardened side surface in order to minimize side wear, but also has a relatively soft peripheral outer portion which minimizes the possibility of fatigue cracks and stress-risers at the edges or corners of the piston ring and permits the piston ring to initially seat into the piston and thereby minimizes ring breakage and blow-by. As representative of a preferred embodiment of the present invention the drawings illustrate a piston ring 10 embodying the present invention.

The piston ring 10 comprises a compression ring carried by a piston 11. The piston 11 reciprocates in a cylinder 12. The upper surface 11a of the piston 11 encounters the expanding gases of an ignited fuel charge. The gases act on surface 11a to force the piston downwardly in the cylinder 12.

The piston 11 typically has three piston ring grooves 14, 15 and 16 located therein. The piston ring groove 14 receives the compression ring 10. The piston ring groove 15 receives another compression ring 20. The piston ring groove 16 receives an oil control ring 21 which is biased outwardly by a spring expander 22, as is conventional. The function of the compression rings 10, 20 and the oil control ring 21 are well known and will not be described in detail herein. Further, the construction of the compression ring 20 and the oil control ring 21 may take a variety of different forms. Accordingly, these rings will not be described in detail herein.

The piston ring groove 14 in the piston 11 which receives the compression ring 10 is defined by a bottom surface 30, an upper side surface 31 and a lower side surface 32. The side surfaces 31 and 32 diverge as they extend radially outwardly from the bottom surface 30. These surfaces (shown in FIG. 3) preferably extend at an angle to the horizontal designated X on the drawings of between 7 degrees, 20 minutes and 7 degrees, 5 minutes inclusive. The side surfaces 31 and 32 intersect the outer periphery of the piston, which is designated 33, and each defines at its intersection with the outer periphery 33 a corner 34, 35, respectively.

The compression ring 10 is received in the piston groove 14 and has a shape which is generally similar to the shape of the groove. Specifically, the piston ring 10 is best shown in FIG. 3 as having a cross-sectional configuration which is generally trapezoidal in shape.

The piston ring 10 specifically has an inner peripheral surface 40 which when located in the groove 14 lies in spaced relationship to the bottom surface 30 of the groove and parallel to the bottom surface 30. The inner peripheral surface 40 is a circular peripheral surface on the body of the piston ring. The side surfaces of the piston ring are designated 41, 42 and these side surfaces diverge as they extend radially outwardly of the piston ring 10 from the inner peripheral surface 40. The side surfaces 41, 42 diverge and extend from the horizontal at an angle Y, which is between 7 degrees, 30 minutes and 7 degrees, 45 minutes inclusive. The surfaces 41, 42 thus are not parallel to the surfaces 31, 32 of the piston ring groove 14. This relationship is shown, somewhat exaggerated in FIG. 3.

The side surfaces 41 and 42 near the outer periphery of the piston ring 10 are provided with flats designated 50, 51, respectively. The flats 50, 51 extend generally perpendicular to the axis of the compression piston ring 10. These flats 50, 51, when the compression piston ring 10 is located in the groove 14 of the piston 11, are located immediately adjacent the corners 34, 35 of the piston.

The outer peripheral surface of the piston ring 10 is provided with a wear material 55 located in a groove 60 formed in the outer periphery of the piston ring. The wear material 55 may be of any suitable known material of which there are many. Specifically, the material, could be such as disclosed in U.S. Pat. Nos. 3,690,686 or 3,697,091 or may further be a chromium plating. It should be clear that the outer surface of the piston ring, that is the surface which engages the cylinder bore 12a and which is designated 61, is of a generally arcuate configuration in cross section.

As the piston reciprocates in the cylinder 12, the piston rings carried by the piston 11 are subject to substantial forces. Specifically, the piston rings move relative to the piston during the reciprocating movement of the piston. For example, the compression ring 10 will engage one sidewall of the piston ring groove such as the sidewall 31 when the piston 11 is moving downwardly and a substantial force acts between the sidewall 41 of the piston ring and the sidewall 31 of the piston ring groove. On upward movement of the piston 11, a substantial force will be created between the sidewall 32 of the piston ring groove and the sidewall 42 of the piston ring. These forces can cause substantial wear between the parts.

Figure 4:
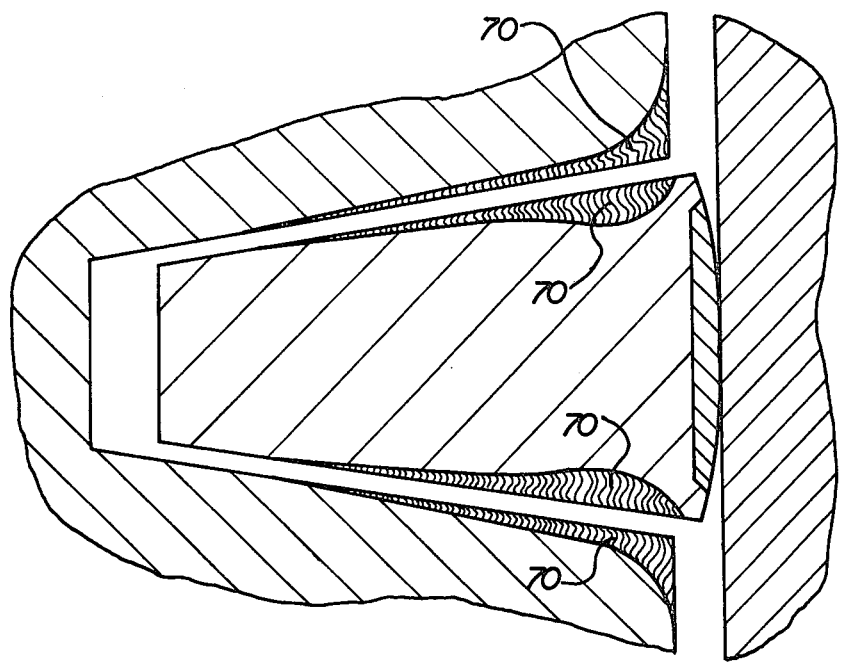
FIG. 4 is a cross-sectional view on an enlarged scale of a piston ring showing a wear pattern after extended engine operation on the sidewall of the piston ring and piston.

FIG. 4 illustrates a typical wear pattern on the sidewalls of a piston ring groove and a compression ring. This Figure is schematic and for illustrative purposes only. It should be apparent from FIG. 4 that the substantial wear of the compression ring tends to occur adjacent the outer periphery of the piston ring and piston ring groove. The area shown by wavy lines in FIG. 4 is the area of wear in the compression ring and piston which occurs after extended engine operation. The wear areas are designated 70. It is clear that a substantial amount of wear in the ring tends to occur near the outer periphery of the ring. Prior techniques for compensating for the side wear of a compression ring have involved hardening the entire periphery of the compression ring or chrome plating the entire sidewall of the piston ring. As a result the corners of the ring adjacent the cylinder bore are hardened or plated. This hardened material or plated material is somewhat brittle, and nicks or cracks can occur relatively easily. As a result of nicking stress-risers are created and fatigue cracks result adjacent to the corners. Hence, blow-by can occur and the life of the piston ring is greatly affected as well as the efficiency of the piston ring.

The side surfaces of a piston ring of the present invention are hardened in a localized area, and specifically in an area where greatest wear tends to occur. As best shown in FIG. 3 the side surface 41 of the piston ring is hardened in the area designated A and the side surface 42 of the piston ring is hardened in the area designated B. The areas A and B are coextensive and as shown in FIG. 3 perferably comprise no less than 40% of the radial extent of the sidewalls 41, 42. Specifically, the hardened areas A, B, respectively, should be 40% or greater of the total radial extent of the sidewalls 41, 42, respectively. Also the hardened areas A, B are located in the outer peripheral portion of the sidewalls and in fact as shown in FIG. 3, the hardened areas A and B comprises approximately 50% of the sidewall portion which extends at an angle to the horizontal.

It should be clearly understood that the portion of the sidewalls 41, 42 of the ring 10 which is unhardened, namely, the portions 50, 51 which are adjacent the corners 34, 35 of the piston 11, are of an extremely small dimension and project outwardly of the piston ring groove 14. As a result, during operation of the piston 11, because of the fact that the outer peripheral portions 50, 51 of the piston ring are relatively soft and not brittle, the possibility of stress-risers and fatigue cracks being created in the corners is minimized. Further, because of the fact that the outer periphery is relatively soft, the corners of the piston are able to be initially seated into the piston ring. Therefore, there is a minimization of gases which can blow-by the piston ring. This makes the piston ring more efficient.

Figure 5:
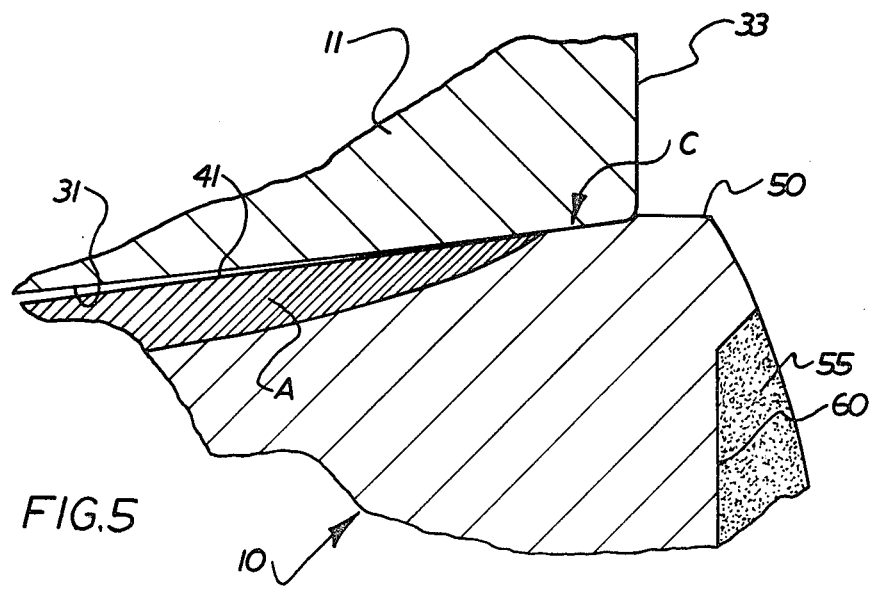
FIG. 5 is a view illustrating how the piston ring of FIG. 3 seats against the piston after initial operation.

FIG. 5 illustrates the piston ring of the present invention after initial operation in the engine. It should be clear the areas 50, 51 of the piston ring are seated into the corners 34, 35 of the piston and therefore provide a seal at the corners which minimizes flow of gases past the piston ring 10. The seating creates an area contact C between the piston corners and the piston ring. After initial seating occurs, the hardened side surface areas limit further wear of the piston corners 34, 35 into the piston ring.

The above describes a typical compression ring for a high output, extended life diesel engine. Compression rings for other engines are of similar construction and typically may have a rectangular cross-sectional configuration. Such rings are employed in low life, reduced output diesel and gasoline engines. The present invention is equally applicable to such rings.

A piston ring in accordance with the present invention may be made in an effective process as compared to the prior art. First, the piston ring blank is formed by forming a ring of cast iron or steel material, as is known. The piston ring blank may then be machined, and, specifically, the outer periphery of the piston ring blank may be machined to form the grooves 60 for receiving the wear material 55. Also, the gap 29 may be milled into the ring. Further, any grinding of the ring blank which is necessary may be performed in order to properly dimension the ring blank.

Figure 6:
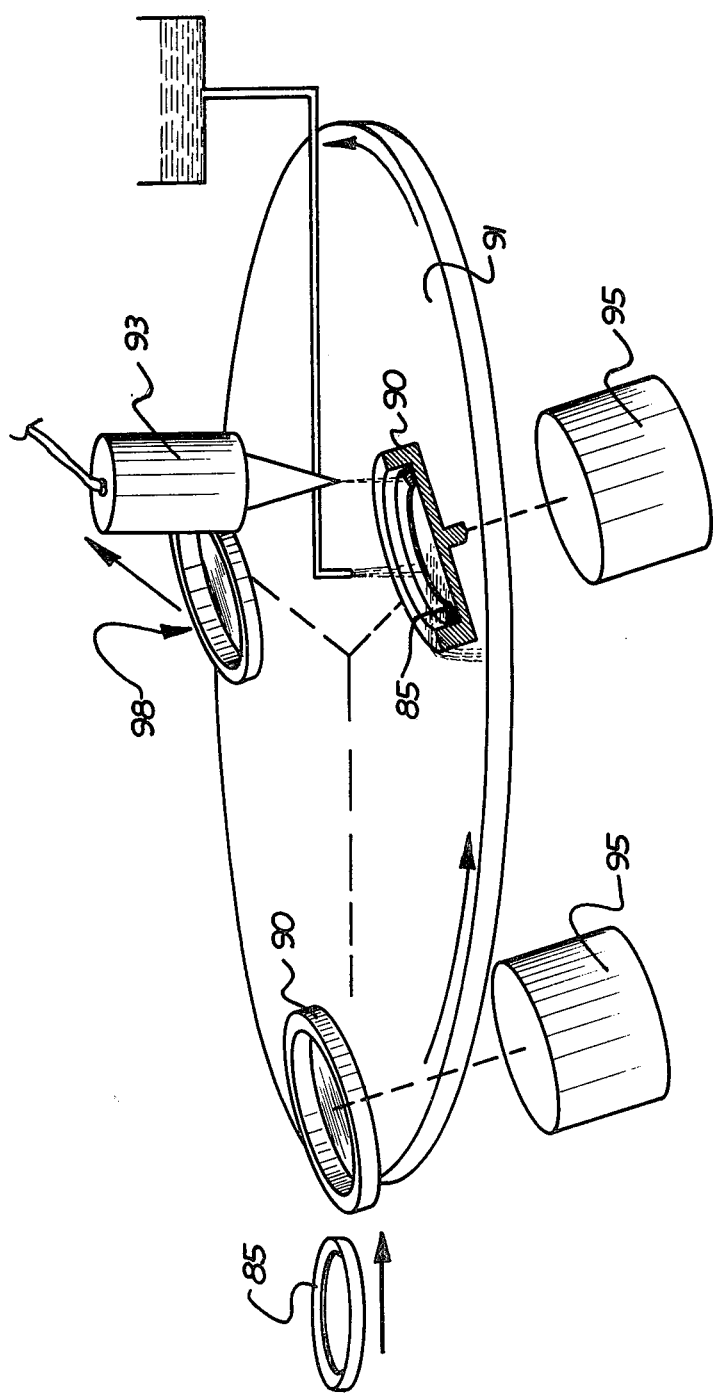
FIG. 6 is a schematic representation of a system for making the piston ring of FIG. 3.

After all of the machining operations are performed, the material 55 which forms the wear surface of the ring 10 and which engages the bore of the cylinder is appropriately deposited into the groove 60 in the outer periphery of the ring and any finish grinding which is deemed necessary is effected. The side surfaces of the ring blank are then hardened. FIG. 6 shows a schematic apparatus for effecting the hardening of the localized areas of the side surfaces of the ring blank.

As shown schematically in FIG. 6, the machined piston ring blank 85 is fed at a feed station into a fixture 90 which is supported on an indexible table 91. The fixture 90 comprises a part which encircles the outer periphery of the piston ring blank 85. The indexible table 91 is then moved approximately 120° into a location where the piston ring blank is located beneath a laser apparatus 93. The laser apparatus may be of any conventional construction and preferably is a carbon dioxide laser having a 1.3 kilowatt rating. The laser structure may correspond to that provided by Photon Sources of Livonia, Mich.

The fixture 90 and piston ring blank, after being positioned immediately beneath the laser apparatus 93, are rotated by a suitable electric motor 95 carried by the indexible table 91. The electric motor 95 is energized in order to rotate the fixture and the piston blank at a speed to provide the proper time of exposure of the piston blank to the laser beam to thereby provide the desired hardness of the localized areas of a side surface of the piston ring blank. After the piston ring blank has been rotated past the laser beam, the indexible table is then indexed 120° to a location 98 where the piston ring blank is removed from the fixture 90. The process must be repeated to effect localized hardening of the opposite sidewall of the piston ring blank 85.

The piston ring 10 is thus produced. The piston ring 10 has the localized areas A and B on the opposite side surfaces of the piston ring hardened. These areas are hardened to approximately a C46 Rockwell hardness level, and are hardened to a depth of approximately 3 to 7 thousandths of an inch. The localized areas A and B comprise arcuate continuous bands of hardened material. Te center of each of the bands is t a substantially constant radius about the center of the ring.

It has been found that good results are obtained through the use of a carbon dioxide laser where a mixture of carbon dioxide, helium and nitrogen are directed through the laser. It has particularly been found to be advantageous to flow carbon dioxide through the laser at a rate of 1 to 1.9 cu. ft. per hr., to flow helium through the laser at a rate of 5 to 5.5 cu. ft. per hr., and to flow nitrogen through the laser at a rate of 3 to 4.5 cu. ft. per hr. The laser produces power between 650 to 1,000 watts. The piston ring blanks are rotated relative to the laser beam at a speed of 120 to 200 inches per minute, and the piston rings are located from $\frac{1}{2}''$ to 1 and $\frac{1}{4}''$ below the focal point of the laser beam. In order to effectively cool the piston ring blank, a water bath at room temperature is provided in which the piston blank is located as the laser beam is acting on the blank. The piston ring blank projects above the level of the water in the water bath.

As shown in FIG. 6, in order to provide for the piston ring blank to project above the level of water in the water bath, the fixtures 90 are located on an angle. The water bath is provided at the lower level of the fixture and the laser beam is located to contact the piston ring at the higher level of the fixture. Accordingly, after a portion of the blank has come into contact with the laser beam, the blank portion is then rotated downwardly into the water bath for a water quench.

From the above, it should be clear that the present invention provides an improved piston ring construction which may be made by an improved process.

What is claimed is:

1. A metal piston ring to be mounted in a tapered groove in a piston, said piston ring having tapered sidewalls for engaging sidewalls of the piston ring groove, said sidewalls of said piston ring extending at a first angle to the horizontal as they diverge radially outwardly, said sidewalls of said piston ring groove extending at a second angle to the horizontal as they diverge radially outwardly, said second angle being less than said first angle, each of said sidewalls of said piston ring being hardened in respective localized areas, said localized areas each including a band of hardened material extending around each respective sidewall of the piston ring near the outer periphery of the piston ring, said hardened band terminating short of the outer periphery of the piston ring, said piston ring due to the termination of the hardened band short of the outer periphery of the piston ring having unhardened side surface areas on each sidewall, said unhardened side surface areas being located at the outer periphery of the ring and extending from the outer periphery of the ring radially inward to terminate in said piston ring groove.

2. A piston ring as defined in claim 1 wherein each of said bands of hardened material comprises an arcuate band which extends throughout the circumferential extent of a respective side surface of the piston ring.

3. A piston ring as defined in claim 1 or 2 wherein said localized hardened areas have a Rockwell hardness of approximately C 46 and a hardness depth from 3 to 7 thousandths of an inch.

4. A piston ring as defined in claim 1 wherein said unhardened side surface areas extend substantially perpendicular to the axis of the piston ring.

5. A piston ring to be mounted in a groove in a piston, said groove having tapered sidewalls and a bottom surface which interconnects the sidewalls of the groove, said piston ring comprising tapered sidewalls for engaging sidewalls of the piston ring groove, said piston ring sidewalls extending at a first angle to the horizontal as they diverge radially outwardly, and said sidewalls of said piston ring groove extending at a second angle to the horizontal as they diverge radially outwardly, said second angle being less than said first angle, each of said sidewalls of said piston ring being hardened in respective localized areas, said localized areas each including a band of hardened material extending around each respective sidewall of the piston ring near the outer periphery of the piston ring, each of said hardened bands comprising at least 40% of the extent of the sidewall of said piston ring and terminating short of the outer periphery of the piston ring, said piston ring due to the termination of the hardened band short of the outer periphery of the piston ring having unhardened side surface areas on each sidewall, said unhardened side surface areas being located at the outer periphery of the ring and extending from the other periphery of the piston ring radially inward to terminate in said piston ring groove.

6. A piston ring as defined in claim 5 further comprising a groove machined in the outer periphery of the piston ring and extending around the ring and a wear coating received in said peripheral groove.

7. A piston ring as defined in claim 5 wherein each of said bands of hardened material has a center located at a constant radius around the periphery of the ring.

8. Apparatus comprising a piston adapted to be moved in a cylinder, said piston having a tapered groove therein, and a metal piston ring mounted in said tapered groove in said piston, said piston ring having tapered sidewalls for engaging sidewalls of the piston ring groove, said sidewalls of said piston ring extending at a first angle to the horizontal as they diverge radially outwardly, and said sidewalls of said piston ring groove extending at a second angle to the horizontal as they diverge radially outwardly, said second angle being less than said first angle, each of said sidewalls of said piston ring being hardened in respective localized areas, said localized areas each including a band of hardened material extending around each respective sidewall of said piston ring near the outer periphery of said piston ring, said hardened band terminating short of the outer periphery of the piston ring, said piston ring due to the termination of the hardened band short of the outer periphery of the piston ring having unhardened side surface areas on each sidewall, there being a boundary between said hardened band and said unhardened side surface areas on each sidewall, said boundary being located radially inward of the radially outer perimeter of said groove, and said unhardened side surface areas seating during initial operation of the piston against the piston ring to thereby provide a seal for preventing blow-by.

9. An apparatus as defined in claim 8 wherein said unhardened side surface areas extend substantially perpendicular to the axis of said piston ring.

10. An apparatus as defined in claim 8 wherein each of said bands of hardened material have a Rockwell hardness of approximately C46 and a hardness depth from 3 to 7 thousandths of an inch.

11. An apparatus as defined in claim 8 wherein said piston ring further includes a groove machined in the outer periphery of said piston ring and extending around the ring and a wear coating received in said peripheral groove.

* * * * *

UNITED STATES PATENT AND TRADEMARK OFFICE
CERTIFICATE OF CORRECTION

PATENT NO. : 4,299,401

DATED : November 10, 1981

INVENTOR(S) : Harold E. McCormick

It is certified that error appears in the above-identified patent and that said Letters Patent are hereby corrected as shown below:

Column 7, line 49, change "other" to --outer--.

Signed and Sealed this

Ninth Day of February 1982

[SEAL]

Attest:

Attesting Officer

GERALD J. MOSSINGHOFF

Commissioner of Patents and Trademarks